Sept. 17, 1935.   A. E. LEACH   2,014,439
CAR JACKING MECHANISM
Filed July 2, 1934
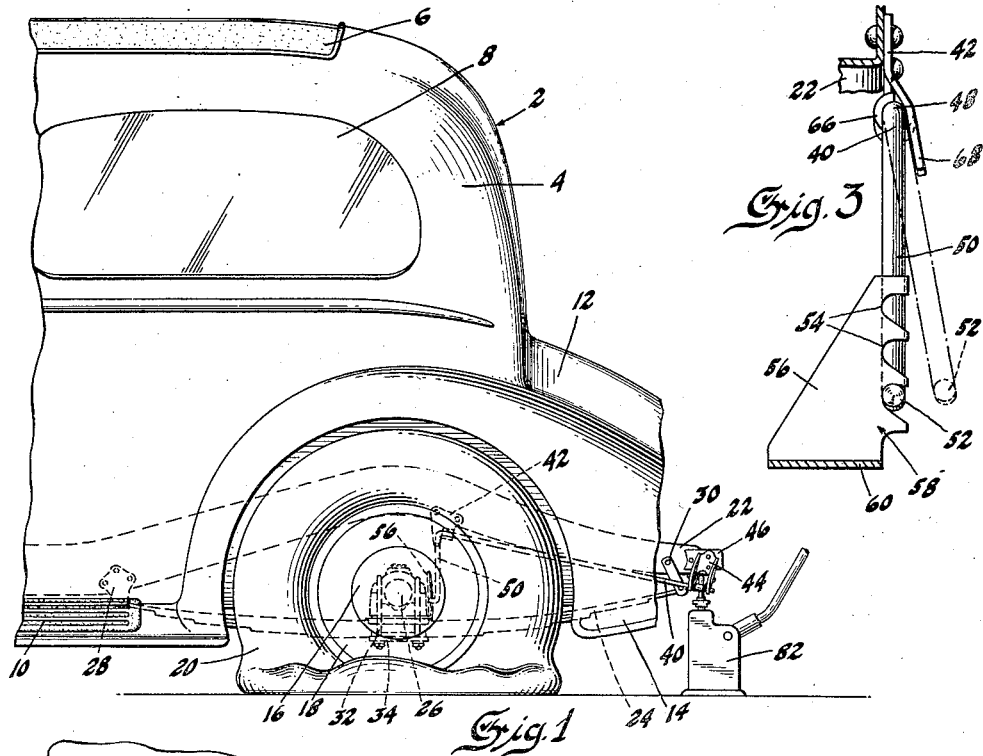

Patented Sept. 17, 1935

2,014,439

UNITED STATES PATENT OFFICE 2,014,439

CAR JACKING MECHANISM

Albert E. Leach, Royal Oak, Mich., assignor to General Motors Corporation, Detroit, Mich., a corporation of Delaware Application July 2, 1934, Serial No. 733,346

6 Claims. (Cl. 280—150)

This invention relates to a car jacking mechanism for use on automotive vehicles.

In modern automotive vehicle practice there is a tendency to extend the rear portion of the body so that it projects beyond the end of the chassis. The sides of the fenders are also provided with aprons or skirts which extend down below the hub of the wheel. Additionally the tires of the vehicle have been increasing in size with the rim of the wheel becoming smaller so that when a tire is deflated the axle is closer to the ground. These three factors have made it difficult and very inconvenient to place a jack under the spring or rear axle when a tire is deflated so that the vehicle could be raised to replace the tire.

It is the object of the present invention to devise a jacking mechanism which will be applicable to all kinds of vehicles, and yet, avoid the inconvenience and annoyances of pushing a jack under the spring or rear axle.

The object of the invention is accomplished by pivoting to the chassis a rod which extends from the chassis rear end to over the rear axle. A hooked end on the rod is adapted to engage with a notched plate secured to the rear axle. A head, secured to the rear end of the rod, is adapted to swing the rod to cause the hook to engage with the notched plate. The head engages beneath the chassis and by applying a jack to the head the vehicle may be raised. When the jack is removed, a spring will swing the head downward and cause the hook end to swing away from the notched plate so that the jacking mechanism will not interfere with the normal spring action of the vehicle springs.

On the drawing:

Figure 1 is a side elevation of the rear portion of an automotive vehicle, showing the jacking mechanism applied, with the tire deflated.

Figure 2 is a broken, enlarged, detailed view of the jacking mechanism.

Figures 3 and 4 are sections of lines 3—3 and 4—4 of Figure 2, the dotted lines showing the inoperative position of the mechanism.

On the drawing, the numeral 2 designates the vehicle as a whole. The vehicle has the usual body 4, top 6, rear window 8, running board 10, rear deck or extension 12 and the skirt or apron 14, which projects downwardly substantially to the level of the running board and below the center of the hub 16 of the wheel 18. The wheel has the usual tire 20. The body is mounted on the chassis 22 which is connected by the springs 24 to the rear axle 26 on which the wheels 18 are mounted. The springs are secured at their ends by means of the shackles 28 and 30 to the frame and by means of the pads 35, the U-bolts 32 and plates 34 to the rear axle 26. Suitable nuts 36 secure the rear axle, U-bolts and plates 34 together. The parts so far described are conventional and per se form no part of the invention except insofar as they relate to the combination.

The jacking mechanism of the invention comprises the rod 40 turnably or rotatably mounted in the brackets 42 and 44. The bracket 42 is secured to the chassis 22, closely adjacent and above the rear axle 26, while the bracket 44 is secured to the rear end of the side bar of the chassis 22. A suitable reinforcing pad or extension 46 may be placed between the bracket 44 and the chassis frame. The rod 40 has its innermost end at the axle bent as indicated at 48, and at the end of the shank portion 50 there is the hook 52 which is adapted to engage in one of the notches 54 on the upright portion 56 of the plate 58. The horizontal portion 60 of the plate 58 is positioned between the pads 35 and 64 which retain the rear axle on the spring 24. The bracket 42 has the eye 66, which journals the rod 40 and the finger 68 which limits the outer movement of the hook 52 away from the plate 58 and notches 54. This structure is best shown in the dotted line position in Figure 3.

The rear bracket 44 has the ears 70 and 72 to journal the rod 40. Between the ears 70 and 72 there is secured to the rod the end of the neck 74 of a head 76. The head 76 is generally of hammer shape and has one end 78 adapted to engage with the chassis frame and the other end 80 adapted to engage with the head of the suitable jack 82 when it is desired to raise the vehicle.

A spring 82 has its ends 84 hooked around the sides of the ears 70 of the bracket 44. The spring is coiled intermediate its ends around the rod 40 and has the loop portion 86 engaging with the neck 74 of the head 76. The spring will always urge the head 76 to the dotted line position shown in Figure 4 to retain the hook end 52 away from engagement of the notches 54 in the plate 58. The dotted line position in Figures 3 and 4 is the normal position of the jacking mechanism when the vehicle in operating. In this position of the parts the plate 58 may move freely up and down with reference to the chassis frame without striking the hook end 52. This will allow a free and normal action of the springs 24.

If it is desired to raise the vehicle, the jack 82 is positioned on the ground under the end 80 of the head 76 and as the jack is screwed up, the head 76 will move from the dotted line position to the full line position to cause the end 78 to strike the chassis. Simultaneously the rod 40 will turn in its journals in the brackets 42 and 44 to cause the hook end 52 to swing into engagement with one of the notches 54 in the plate 58. The continued operation of the jack to raise the vehicle will cause the chassis and rear axle to move as a unit to raise the vehicle sufficiently so that the tire 20 may be changed. As the jack is lowered and the inflated tire comes to rest on the ground, the head 76 will be moved by the spring 82, from the full line position in Figure 4 to the dotted line position again to swing the hook 52 away from the notches 54.

It is to be understood that a jacking device as shown and described, is applied to the other side of the vehicle as well.

I claim:

1. A jacking mechanism for a vehicle having a chassis and an axle connected thereto, a rod journaled on the chassis and extending from the rear thereof to a point substantially above the axle, a hook rigid with the end of the rod extending to the axle, means on the axle engageable by the hook when the rod is turned, and means on the end of the rod adapted to turn the rod, to cause the hook to engage with the said means on the axle when the jack is applied to said second named means to raise the vehicle.

2. A jacking mechanism for a vehicle having a chassis and an axle connected thereto, a rod journaled on the chassis and extending from the rear thereof to a point substantially above the axle, a hook rigid with the end of the rod extending toward the axle, means on the axle engageable by the hook when the rod is turned to interconnect the hook and the axle, means on the end of the rod adapted to turn the rod to cause the hook to engage with the said means on the axle when the jack is applied to said second named means to raise the vehicle, and means to turn the rod and swing the hook away from said means on the axle when the jack is removed.

3. A jacking mechanism for a vehicle having a chassis and an axle connected thereto, a rod journaled on the chassis and extending from the rear thereof to a point substantially above the axle, a hook rigid with the end of the rod extending toward the axle, means on the axle engageable by the hook when the rod is turned rigidly to connect the hook and axle, and means on the end of the rod adapted to be turned into engagement with the chassis and to turn the rod into engagement with said means on the axle when a jack is applied to raise the vehicle.

4. In a jacking mechanism for a vehicle having a chassis and an axle connected thereto, a plurality of brackets secured to the chassis, a rotatable rod journaled in said brackets, a hook on the end of the rod adjacent the axle, means on one of said brackets to limit the rotation of the rod, means secured to the axle and adapted to be engaged by the hook when it is rotated away from the said limiting means, and means on the rod engageable by a jack and swingable into engagement with the chassis frame to rotate the hook into engagement with the means on the axle to allow the vehicle to be raised by the jack.

5. In a jacking mechanism for a vehicle having wheels mounted thereunder and a chassis, means rotatably mounted on the chassis and extending from one end thereof to adjacent a wheel, means attached to the mounting for the wheels and adapted to be engaged by said rotatably mounted means when said rotatably mounted means is rotated, and a swingable member rigidly attached directly to the end of said first-named means and adapted to be engaged directly by a jack to rotate said first named means to cause the wheels to be locked with the chassis, said swingable member engaging the chassis when the jack is applied, the raising of said pack causing the chassis and wheel to be raised as a unit.

6. In a jacking mechanism for a vehicle having a chassis and an axle connected to said chassis, a hook having a rod portion rotatably mounted in bearings on the chassis, means attached to the axle and adapted to be engaged by the hook when the hook is turned rigidly to connect the axle and the chassis, the said rod portion of said hook extending to the end of the chassis, and means on the end of the rod portion for applying a jack and preventing the rotation of the hook during the raising of the vehicle, said last named means engaging the chassis when the jack is operated.

ALBERT E. LEACH.